United States Patent
Kim et al.

(10) Patent No.: US 9,787,130 B2
(45) Date of Patent: Oct. 10, 2017

(54) BATTERY CHARGING METHOD AND ELECTRONIC DEVICE

(71) Applicant: Samsung Electronics Co., Ltd., Gyeonggi-do (KR)

(72) Inventors: Hee-Tae Kim, Daegu (KR); Ku-Chul Jung, Seoul (KR); Kwang-Sub Lee, Gyeonggi-do (KR); Se-Young Jang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 840 days.

(21) Appl. No.: 13/908,311

(22) Filed: Jun. 3, 2013

(65) Prior Publication Data
US 2013/0334883 A1 Dec. 19, 2013

(30) Foreign Application Priority Data
Jun. 19, 2012 (KR) ........................ 10-2012-0065421

(51) Int. Cl.
| | |
|---|---|
| *H02J 7/34* | (2006.01) |
| *H02J 7/00* | (2006.01) |
| *H02J 7/02* | (2016.01) |
| *G06F 1/26* | (2006.01) |

(52) U.S. Cl.
CPC ............... *H02J 7/34* (2013.01); *G06F 1/263* (2013.01); *G06F 1/266* (2013.01); *H02J 7/0055* (2013.01); *H02J 7/025* (2013.01); *H02J 2007/0062* (2013.01); *Y10T 307/391* (2015.04)

(58) Field of Classification Search
CPC ........ G06F 1/263; G06F 1/266; H02J 7/0055; H02J 7/025; H02J 7/34; H02J 2007/0062; H02J 3/14; H02J 1/10; H02J 9/061; Y10T 307/391; Y02B 70/3225; Y04S 20/222
USPC ........................................................... 307/29
See application file for complete search history.

(56) References Cited

U.S. PATENT DOCUMENTS

| | | | |
|---|---|---|---|
| 6,177,778 B1 * | 1/2001 | Miller ................... | H02J 7/0045 |
| | | | 320/112 |
| 7,034,503 B2 | 4/2006 | Veselic et al. | |
| RE46,111 E * | 8/2016 | Kook | |
| 2003/0030412 A1 | 2/2003 | Matsuda et al. | |
| 2003/0081439 A1 | 5/2003 | Doss et al. | |
| 2005/0100100 A1 | 5/2005 | Unger | |
| 2007/0114849 A1 * | 5/2007 | Falik ..................... | H02J 7/0068 |
| | | | 307/64 |

(Continued)

FOREIGN PATENT DOCUMENTS

| | | |
|---|---|---|
| CN | 201084803 Y | 7/2008 |
| CN | 101414753 A | 4/2009 |

(Continued)

OTHER PUBLICATIONS

Japanese Search Report dated May 24, 2016.
(Continued)

*Primary Examiner* — Thienvu Tran
*Assistant Examiner* — Brian K Baxter
(74) *Attorney, Agent, or Firm* — Cha & Reiter, LLC (57) ABSTRACT

A method comprises providing power from a battery to an external device using a first circuit; and receiving power from a first power source to provide power to the battery using a second circuit while providing power to the external device.

10 Claims, 9 Drawing Sheets

(56) References Cited

U.S. PATENT DOCUMENTS

| | | | |
|---|---|---|---|
| 2007/0190848 A1* | 8/2007 | Zhang | H01R 13/6675 439/500 |
| 2007/0300089 A1* | 12/2007 | Bhogal | G06F 1/263 713/320 |
| 2008/0143290 A1* | 6/2008 | Chavakula | H02J 7/0055 320/101 |
| 2008/0172566 A1* | 7/2008 | Park | G06F 1/263 713/310 |
| 2008/0174277 A1 | 7/2008 | Ueno | |
| 2008/0231235 A1 | 9/2008 | Thijssen | |
| 2008/0278002 A1* | 11/2008 | Platania | H02J 7/0065 307/49 |
| 2009/0278406 A1* | 11/2009 | Hoffman | H02J 7/0054 307/66 |
| 2010/0156179 A1* | 6/2010 | Veselic | H02J 7/0052 307/35 |
| 2010/0169534 A1 | 7/2010 | Saarinen et al. | |
| 2010/0253281 A1 | 10/2010 | Li | |
| 2010/0273443 A1 | 10/2010 | Forutanpour et al. | |
| 2010/0277120 A1 | 11/2010 | Cook et al. | |
| 2011/0050164 A1* | 3/2011 | Partovi | H01F 5/003 320/108 |
| 2011/0131426 A1* | 6/2011 | Nakanishi | G06F 1/263 713/300 |
| 2011/0156636 A1* | 6/2011 | Kim | H02J 7/0055 320/108 |
| 2011/0234148 A1* | 9/2011 | Wen | H01M 10/48 320/101 |
| 2011/0316472 A1* | 12/2011 | Han | G06F 13/4068 320/103 |
| 2012/0007367 A1 | 1/2012 | Chang | |
| 2012/0007551 A1 | 1/2012 | Song et al. | |
| 2012/0019193 A1* | 1/2012 | Yu | G06F 1/266 320/103 |
| 2012/0043931 A1 | 2/2012 | Terao et al. | |
| 2012/0158229 A1 | 6/2012 | Schaefer | |
| 2012/0166697 A1* | 6/2012 | Hu | H02J 7/0042 710/300 |
| 2012/0286724 A1* | 11/2012 | Tsai | H02J 7/025 320/108 |
| 2014/0285022 A1* | 9/2014 | Dao | H02J 9/061 307/66 |

FOREIGN PATENT DOCUMENTS

| | | |
|---|---|---|
| CN | 102 064 582 A | 5/2011 |
| CN | 102064582 A | 5/2011 |
| JP | 05-064376 A | 3/1993 |
| JP | 3125314 U | 8/2006 |
| JP | 2007-157355 A | 6/2007 |
| JP | 2008-182822 A | 8/2008 |
| JP | 2009-247161 A | 10/2009 |
| JP | 2010-041819 A | 2/2010 |
| JP | 2011-118455 A | 6/2011 |
| JP | 2012-65537 A | 3/2012 |
| KR | 10-2003-0087790 A | 11/2003 |
| KR | 10-2005-0042045 A | 5/2005 |
| KR | 10-2007-0011242 A | 1/2007 |
| KR | 10-2009-0117295 A | 11/2009 |
| KR | 10-2010-0062810 A | 6/2010 |
| KR | 10-2012-0003512 A | 1/2012 |
| KR | 10-2012-0003513 A | 1/2012 |
| KR | 10-2012-0003953 A | 1/2012 |
| KR | 10-2012-0004926 A | 1/2012 |
| KR | 10-2012-0005484 A | 1/2012 |
| KR | 10-2012-0005527 A | 1/2012 |
| KR | 10-2012-0005747 A | 1/2012 |
| KR | 10-2012-0006538 A | 1/2012 |
| KR | 10-2012-0006692 A | 1/2012 |
| KR | 10-2012-0006704 A | 1/2012 |
| KR | 10-2012-0006743 A | 1/2012 |
| KR | 10-2012-0006883 A | 1/2012 |
| KR | 10-2012-0006885 A | 1/2012 |
| KR | 10-2012-0007254 A | 1/2012 |
| KR | 10-1103697 B1 | 1/2012 |
| KR | 10-1104354 B1 | 1/2012 |
| KR | 10-1104434 B1 | 1/2012 |
| KR | 10-1106834 B1 | 1/2012 |
| RU | 2 400 904 C1 | 9/2010 |
| WO | 2008/038057 A1 | 4/2008 |
| WO | 2010/035256 A2 | 4/2010 |

OTHER PUBLICATIONS

Chinese Search Report dated Aug. 31, 2016.
Australian Search Report dated Oct. 18, 2016.
Canadian Search Report, Dated: Dec. 12, 2016.
Australian Search Report, Dated: Jan. 25, 2017.
Chinese Search Report, Dated: Feb. 16, 2017.
Australian Search Report dated May 9, 2017.
Chinese Search Report dated Jul. 11, 2017.

* cited by examiner

BATTERY CHARGING METHOD AND ELECTRONIC DEVICE

CLAIM OF PRIORITY

This application claims priority under 35 U.S.C. §119 to an earlier application filed in the Korean Intellectual Property Office on Jun. 19, 2012 and assigned Serial No. 10-2012-0065421, the content of which is incorporated herein by reference in its entirety.

TECHNICAL FIELD

The present disclosure relates to a method for charging a battery of an electronic device.

BACKGROUND

With popular and high demand for a portable electronic device, there is a growing interest in a high performance battery that can extend battery life and improve its performance.

An electronic device may provide a USB (Universal Serial Bus) On-The-Go (OTG) function. The USB OTG function allows electronic devices, such as a Personal Digital Assistant (PDA), a MP3 player, a mobile phone, a mouse, a keyboard, a memory and the like, to communicate with each other through a USB connection without intervention of a computer. For example, a function of transmitting data when a storage device is connected to a mobile phone through a USB connection is called an USB OTG function.

A USB connection may provide for a supply of power (e.g. 5-volt power supply) and it may be possible to use a USB cable as a power source for recharging batteries. For example, when a USB OTG operation is performed, an electronic device acting as a server may supply power to an electronic device acting as a client.

In addition, an electronic device may be supplied with one specific charging circuit selected by a manufacturer. For example, the electronic device may include one specific charging circuit selected by a manufacturer.

SUMMARY

A method in an electronic device comprises: providing power from a battery to an external device using a first circuit; and receiving power from a first power source to provide power to the battery using a second circuit while providing power to the external device.

An electronic device comprises: a battery; a first circuit for providing power from the battery to an external device; and a second circuit for receiving power from a first power source to provide power to the battery while the first power source provides the power to the external device.

A method in an electronic device comprises: selecting a circuit from a plurality of circuits, based on determining that a first electronic device is connected to a second electronic device; and charging a battery using power supplied from the first electronic device via the selected charging circuit.

An electronic device comprises: a battery; a plurality of charging circuits; and a processor for selecting a circuit from a plurality of circuits, based on determining that a first electronic device is connected to a second electronic device, wherein the selected circuit charges the battery using power supplied from the first electronic device.

BRIEF DESCRIPTION OF THE DRAWINGS

For purposes of explanation, several aspects of the present disclosure are set forth in the following figures.

DETAILED DESCRIPTION

Various embodiments of the present disclosure are described below with reference to the accompanying drawings. For the purposes of clarity and simplicity, detailed descriptions of well-known functions or configurations may be omitted as they may unnecessarily obscure the subject matters of the present disclosure.

An electronic device described in the present disclosure may be, for example, a mobile terminal, a smart phone, a tablet personal computer, a digital camera, a MP3 player, a laptop computer, a netbook and a potable game player, or other electronic devices having a battery. A battery as described in the present disclosure may be a rechargeable battery.

The following description will be given for an example case where an electronic device includes two charging circuits. However, it should be noted that the teachings of the present disclosure can be applied to a case where the electronic device includes two or more charging circuits.

Figure 1:
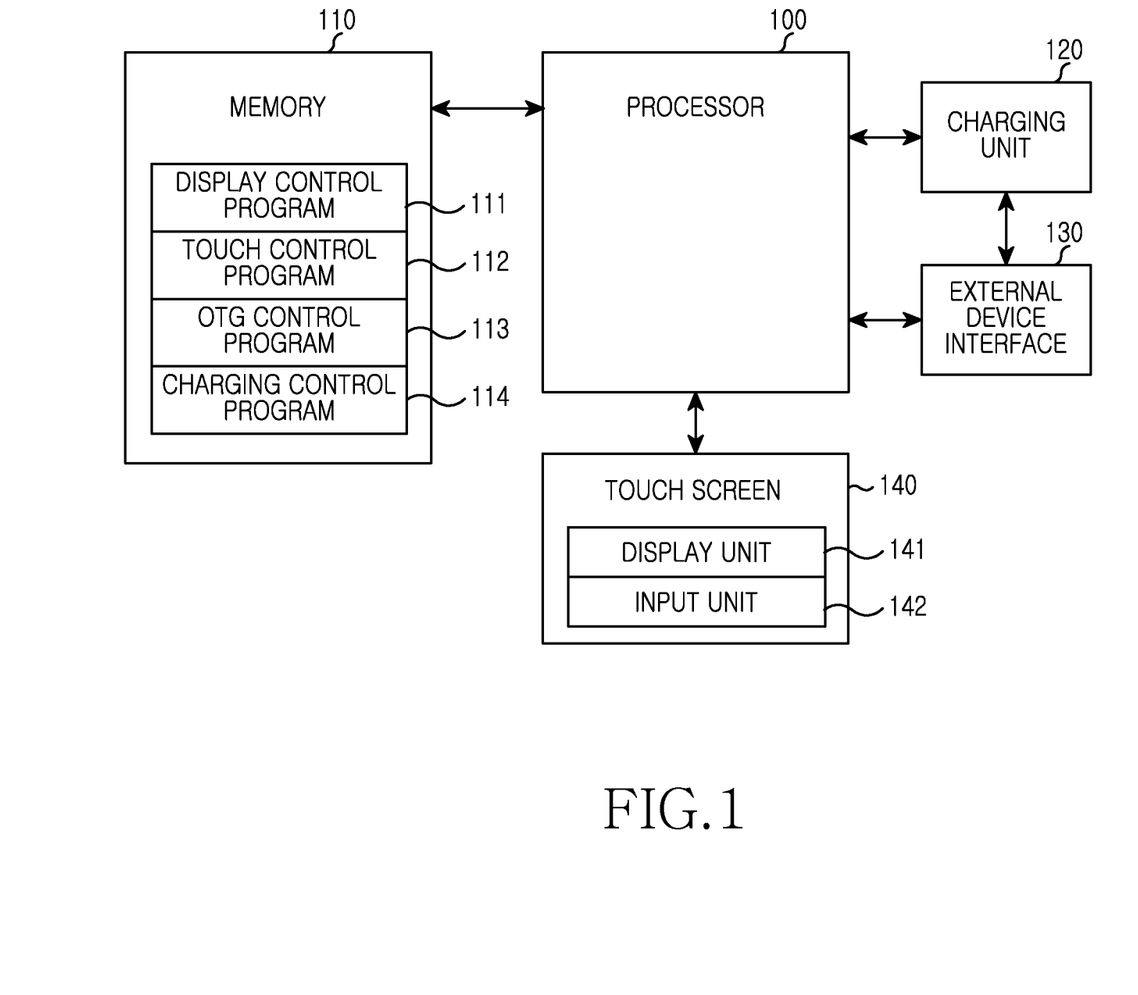
FIG. 1 is a diagram illustrating a block configuration of an electronic device according to the present disclosure.

FIG. 1 illustrates a block configuration of an electronic device according to the present disclosure.

Referring to FIG. 1, the electronic device may include a processor 100, a memory 110, a charging unit 120, an external device interface 130, and a touch screen 140.

The processor 100 may execute various software programs to control and process an overall operation of the electronic device. The processor 100 may execute software programs stored in the memory 110 to perform functions corresponding to the executed software programs. The operation described below that may be described as being performed by the processor 100 may also be performed by at least one hardware that is separately configured, and/or may be performed by software. For example, the operations of the processor 100 may be executed directly by hardware integrated in the charging unit 120. The processor 100 may be implemented using one Or more processors.

The processor 100 according to the present disclosure may execute an OTG control program 113 stored in the memory 110 to operate in a USB OTG mode. That is, the processor 100 may control functions for supplying power while communicating with a device that is connected through the external device interface 130. For example, the connected device may be an external electronic device capable of being connected to the electronic device through a USB connection such as, for example, a mobile phone, a keyboard, a mouse or a storage device, for exchanging signals. The connected device may be, for example, a wire-connection device which is connected to the electronic device using a wired connection.

Further, the processor 100 may execute a charging control program 114 to cause the charging unit 120 to receive power from a wired charging device and/or a wireless charging device connected to the electronic device through the external device interface 130 for charging a battery. The processor 100 may cause power supplied from a wire charging device and a wireless charging device, both of which may be supplied through the external device interface 130, to be applied to the charging device 120 through different input terminals. Using the different input terminals, the charging unit 120 can perform wire charging and wireless charging simultaneously. The wired charging device may be, for example, a Travel Adaptor (TA) or a USB charger that are connected to the electronic device through USB connection. The wireless charging device may be, for example, an external device wirelessly connected to the electronic device through the external device interface 130.

Further, the processor 100 may cause the charging unit 120 to charge a battery by wireless charging from the external device interface 130 during a wireless charging mode while, for example, the electronic device is in the USB OTG mode.

In addition, for example, when the connection of the wired charging device (e.g., power adapter) to the external device interface 130 is detected, the processor 100 may detect the ID, type and/or charge capacity of the connected wired charging device. The processor 100 may select a suitable charging circuit (or circuitry) corresponding to the detected ID, type and/or charge capacity of the wired charging device between the two charging circuits that are included in the charging unit 120, and then may cause the charging unit 120 to charge the battery through the selected charging circuit. The processor 100 can obtain information about the type of the wire charging device through the ID information received from the charging device. The ID information of the charging device may be obtained, for example, based on a detected voltage (or a current) value at ID pin included in the external device interface 130. For example, if the voltage (current) value detected via the external device interface 130 is one corresponding to the connection a travel adaptor (TA) (, the processor may determine the type of the wire charging device to the external device interface 130 as the TA. As another example, if the resistance value detected via the external device interface 130 is another corresponding to a USB storage device or a USB charger, the processor may determine the type of the wire charging device to the external device interface 130 as the USB storage device or the USB charger.

The memory 110 stores various programs and data including commands for an overall operation of the electronic device. The memory 110 may be implemented, for example, using one of high-speed random-access memory (RAMs) and/or nonvolatile memory such as a magnetic disk storage device, one or more optical storage devices, and/or a flash memory (for example, NAND flash memory or NOR flash memory).

The various programs stored in the memory 110 may include a display control program 111, a touch processing program 112, an OTG control program 113 and a charging control program 114. In addition, the memory 110 may store charge circuitry selection information corresponding to type and/or charge capacity of a particular charging device that may be used in determining the charge circuitry for charging the electronic device.

The display control program 111 may include instructions for displaying various information generated during operation of the electronic device on the display unit 141. For example, the display control program 111 may include instructions for displaying information indicating that the electronic device is performing a wired charging and/or a wireless charging on the display unit 141 and instructions for displaying information indicating that the electronic device is performing the USB OTG operation while performing a wireless charging on the display unit 141.

The touch processing program 112 includes a command for detecting a user input generated through the input unit 142 of the touch screen during operation of the electronic device. For example, the touch processing program 112 may include a command for detecting a user input requiring entry into the USB OTG mode.

The OTG control program 113 may include instructions for supplying power to the wire-connection device when the wire-connection device is detected through the external device interface 130, while communicating with the detected wire-connection device.

The charging control program 114 may include instructions for receiving power from the wire charging device and/or the wireless charging device connected to the electronic device and enabling the battery to be charged when a connection to the wire charging device and/or the wireless charging device is detected through the external device interface 130.

In addition, the charging control program 114 may include instructions for selecting a charging circuit corresponding to the type and/or charge capacity of a specific wire charging device when the connection to the wire charging device is detected and charging the battery using the selected charging circuit. For example, if the ID of the wired charging device represents a TA having a charging current equal to or greater than 1 A, the charging control program 114 may select a switching charging circuit which may have higher efficiency and lower heat generation. If the ID of the wire charging device represents a USB storage device having a charging current of 400 mA or a TA having a charging current of 500 mA, the charging control program 114 may select a linear charging circuit which may have higher resistance to Electro Magnetic Interference (EMI) and a headroom voltage.

For selecting a charging circuit based on the detected ID of the wire charging device as discussed above, charging current information of the wire charging devices or charging circuit information, for the respective IDs of the wire charging device, may be used. The charging current information and/or the charging circuit information may be stored, for example in the memory 110.

In another example, the charging control program 114 may include a command for selecting the switching charging circuit if the charge capacity of the wire charging device is equal to or higher than a threshold value or selecting the linear charging circuit if the charge capacity of the wire charging device is lower than the threshold value. The switching charging circuit may be a charging circuit for performing the supply and shut-off of power repeatedly, and may include one of a switching regulator, a buck regulator, a booster regulator and a SEPIC regulator. The linear charging circuit may be a charging circuit that supplies some voltage out of an entire available voltage for charging, while dissipating remaining voltage as heat. The linear charging circuit may include a linear regulator.

For charging the battery (not shown), the charging unit 120 may receive power from a wireless charging device and/or a wired charging device connected the electronic device via an external device interface according to the control of the processor 100. That is, for charging the battery, the charging unit 120 may convert power supplied from the wireless charging device and/or the wired charging device into a charging voltage and a charging current that are suitable for the electronic device. In addition, the charging unit 120 may provide the wire-connection device connected to the electronic device through the external device interface 130 with the charging voltage and charging current of the battery (not shown). The charging unit 120 may detect a wireless charging event by detecting induced current inputted via an external device interface.

Figure 2A:
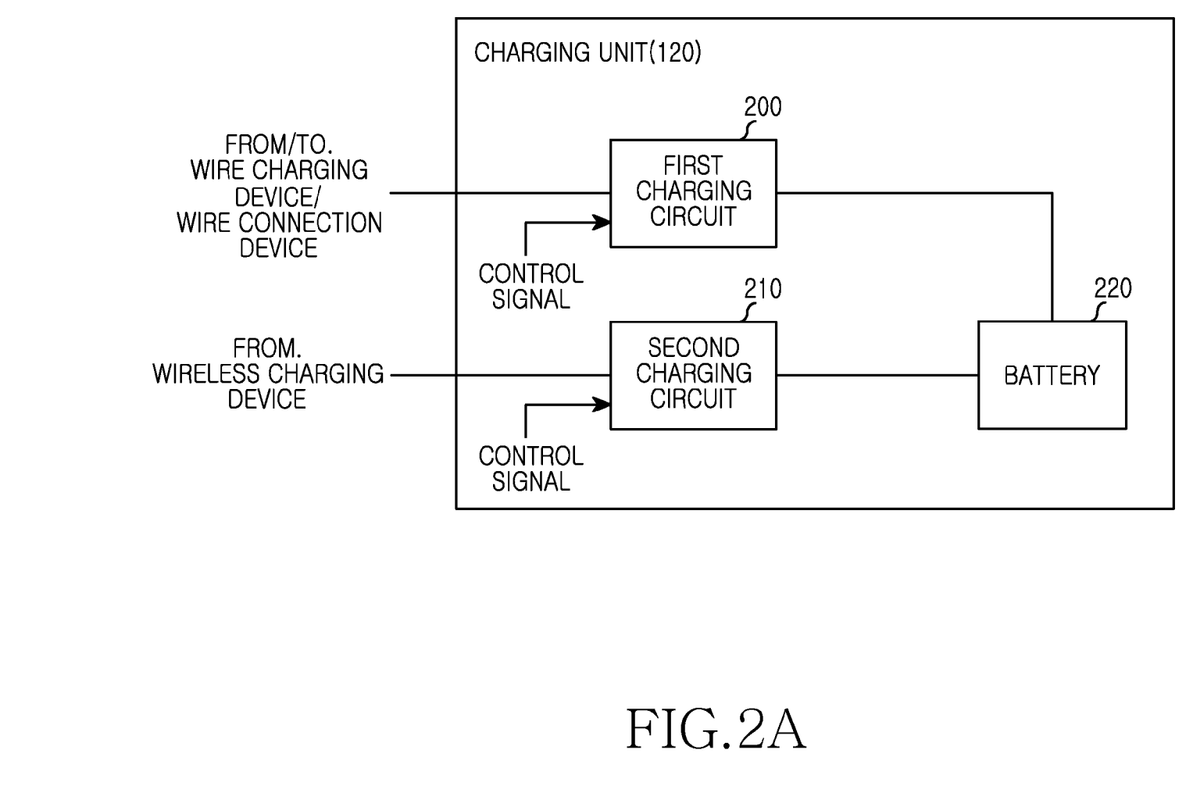
FIGS. 2A and 2B is a diagram illustrating block configuration of the charging unit of an electronic device according to the present disclosure.

According to an embodiment of the present disclosure, the charging unit 120 may include a first charging circuit 200 and a second charging circuit 210 which receive different inputs as illustrated in FIG. 2A.

Referring to FIG. 2A, the first charging circuit 200 is electrically connected to the wire charging device or the wire-connection device which is wire-connected to the electronic device via an external device interface 130. The first charging circuit 200 may convert power supplied from the wire charging device into a charging voltage and a charging current according to a control signal from the processor 100 and may also provide the converted charging voltage and charging current to the battery 220. The first charging circuit 200 may provide the charging voltage and the charging current of the battery 220 to the wire connection device according to the control signal. Also, the first charging circuit 200 may include a switch, and through a switching operation controlled by the processor 100, may provide power supplied from the wire charging device to the second charging circuit 210 without processing. Further, when the wire charging device is connected to the electronic device through the external device interface 130, the first charging circuit 200 may determine the capacity of the charging current (charging capacity) of the wire charging device and may inform the processor 100 of the charging capacity. Moreover, depending on designs, the first charging circuit 200 may determine charging capacity of the connected wire charging device, and directly process the received power according to the determined charging capacity without control of the processor 100, to charge the battery. The first charging circuit 200 may be, for example, a switching charging circuit or a linear charging circuit.

The second charging circuit 210 may receive power input from the wireless charging device wirelessly connected to the electronic device through the external device interface 130. The second charging circuit 200 may convert the power supplied from the wireless charging device into the charging voltage and the charging current, according to the control signal of the processor 100, and provide to the battery 220. The second charging circuit 200 may be a switching charging circuit or a linear charging circuit. For example, the first charging circuit 200 and the second charging circuit 210 may be the same type of charging circuit or different types of charging circuits. In addition, the first charging circuit 200 and the second charging circuit 210 may be integrated into a single chip or respectively into two chips.

As described above, by including the first charging circuit 200 and the second charging circuit 210 the charging unit 120 may charge the battery 220 by receiving power from the wire charging device and at the same time from the wireless charging device through the first charging circuit 200 and the second charging circuit, respectively. In addition, the charging unit 120 can supply power from the battery 220 to the wire connection device that is connected to the electronic device through the external device interface 130 via the first charging circuit 200, and at the same time receive the power from the wireless charging device that is connected to the electronic device through the external device interface 130 via the second charging circuit 210 to charge the battery 220.

Figure 2B:
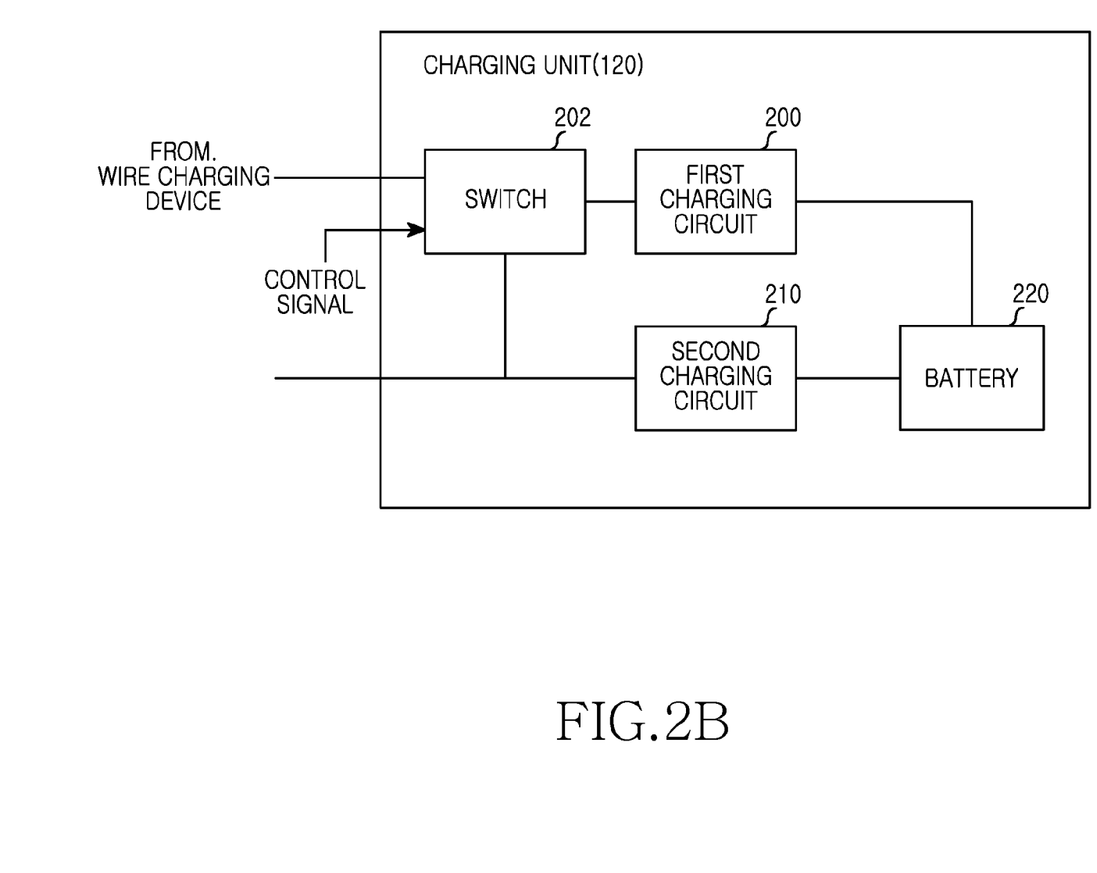

According to another embodiment of the present disclosure, the charging unit 120 may include a first charging circuit 200, second charging circuit 210 and a switch 202 as illustrated in FIG. 2B.

Referring to FIG. 2B, the switch 202 may perform a switching operation to connect the first charging circuit 200 and power supply path of the wire charging device or connect the second charging circuit 210 and power supply path of the wire charging device, according to a control signal from the processor 100. For example, the switch 202 may connect the first charging circuit 200 and power supply path of the wire charging device and provide the power supplied from the wire charging device to the first charging circuit. As another example, the switch 202 may connect the second charging circuit 210 and power supply path of the wire charging device and provide the power supplied from the wire charging device to the second charging circuit.

The first charging circuit 200 may be electrically connected to the wire charging device via the switch 202 and via the external device interface 130. The first charging circuit 200 may convert power supplied from the wire charging device into a charging voltage and a charging current, and provide the converted charging voltage and charging current to the battery 220. Further, the first charging circuit 200 may determine the capacity of the charging current (e.g., charging capacity) of the wire charging device and inform the processor 100 of the charging capacity when the wire charging device is connected to the electronic device through the external device interface 130. The first charging circuit 200 may be a switching charging circuit or a linear charging circuit.

The second charging circuit 210 may be electrically connected to the wire charging device via the switch 202 and via the external device interface 130. The second charging circuit 210 may convert power supplied from the wire charging device into a charging voltage and a charging current and provide the converted charging voltage and charging current to the battery 220. The second charging circuit 200 may be a switching charging circuit or a linear charging circuit. For example, the first charging circuit 200 and the second charging circuit 210 may be the same type of charging circuit or different types of charging circuits. In addition, the first charging circuit 200 and the second charging circuit 210 may be integrated into a single chip or respectively into two chips.

As described above, the charging unit 120 may charge the battery 220 using a specific charging circuit corresponding to the charge capacity of the wire charging device by controlling the switch 202 according to control of the processor 100.

The external device interface 130 may connect an external electronic device with the processor 100 and the charging unit 120. The external device interface 130 may include a USB connection terminal and detect an external device or a charging device that is connected to the electronic device using a wired connection, and inform the processor 100 of the detection of the external device or charging device. In addition, the external device interface 130 may detect the connection of a wireless charging device. For example, the external device interface 130 may detect the wireless charging device and inform the processor 100 of the detection of the wireless charging device when an induced current caused by an external charge pad is detected. The external device interface 130 may apply the power supplied from the wire charging device to the first charging circuit 200, and may apply the power supplied from the wireless charging device to the second charging circuit 210.

The touch screen 140 may provide an interface for inputs and outputs between the electronic device and a user. The touch screen 140 may include a display unit 141 and an input unit 142. The touch screen 140 may be a medium through which a touch input of the user may be detected and delivered to the processor 100 and/or an output from the processor 100 may be displayed and provided to the user.

The display unit 141 may display various information generated during operation of the electronic device according to control of the processor 100. For example, the display unit 141 may display information indicating that the electronic device is performing wire charging and/or wireless charging, or display information indicating that the electronic device is performing wireless charging while performing the USB OTG operation.

The input part 142 may include a touch sensor for detecting a touch on the display unit 141. For example, the input part 142 may detect a user input requesting entry into the USB OTG mode and may provide the detected result to the processor 100.

Figure 3:
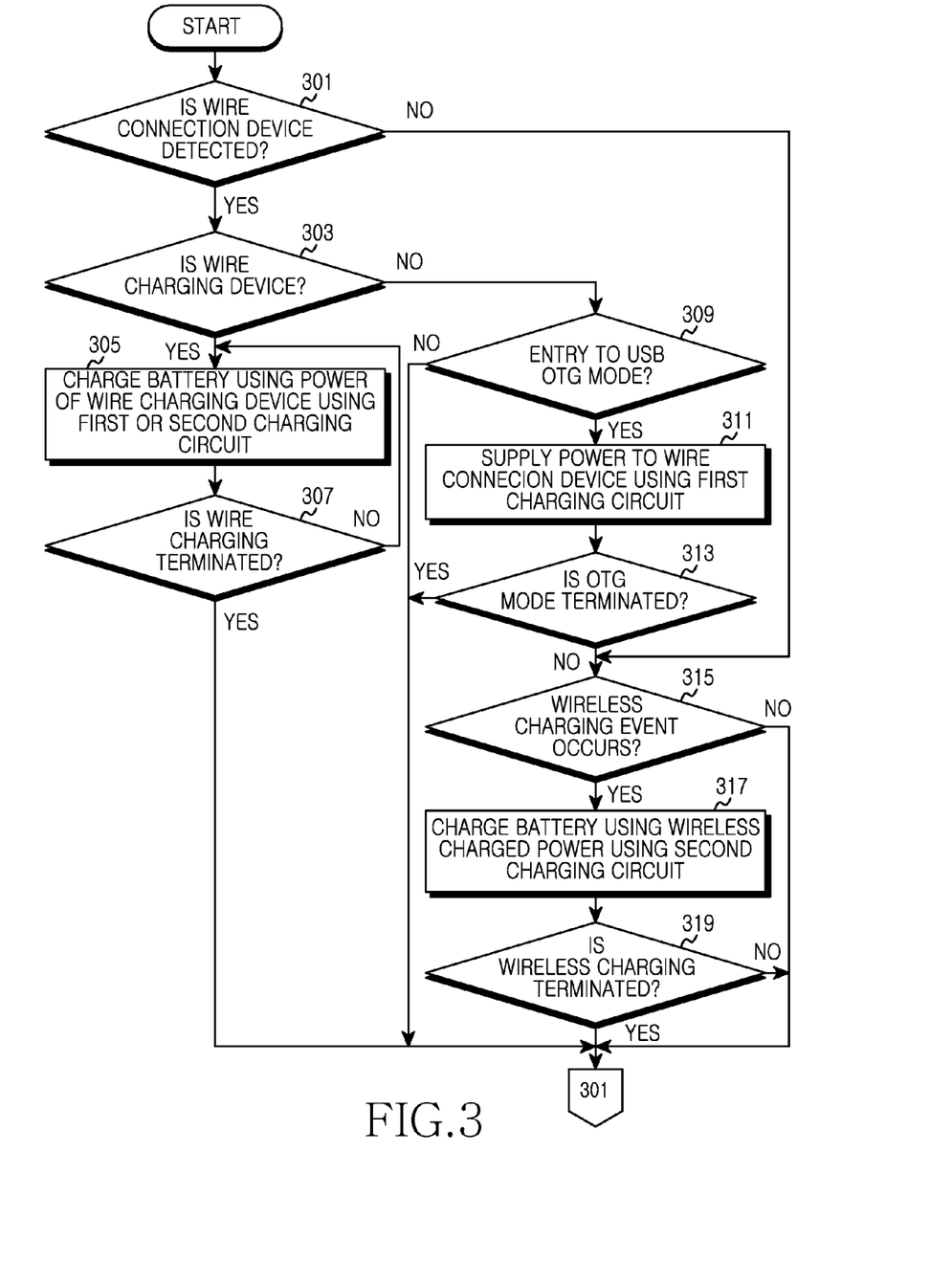
FIG. 3 is a diagram illustrating a procedure of performing an OTG and charging according to an embodiment of the present disclosure.

FIG. 3 illustrates an example process for providing a USB OTG function and charging function according the present disclosure. The operations of the process may be performed, for example, by the electronic device.

Referring to FIG. 3, the electronic device may check whether a wire connection device is detected at block 301. If the wire connection device is not detected, block 315 may be performed. On the other hand, if the wire connection device is detected at block 301, at block 303 the electronic device may determine whether the wire connection device is a charging device (e.g., a charger) for supplying power or whether the wire connection device is an external electronic device for performing the USB OTG function. For example, the electronic device may determine whether the wire connection device is a charging device based on ID information received from the wire connection device.

The processor 100 can obtain information about the type of the wire charging device through the ID information received or detected from the charging device. The ID information of the charging device may be obtained, for example, based on a voltage (or current) value at ID pin included in the external device interface 130 or detected when coupled thereto. For example, as described in connection with the FIG. 1, if the voltage (or current) value detected via the external device interface 130 is one, the processor may determine the type of the wire charging device to the external device interface 130 as a travel adaptor (TA). As another example, if the resistance value detected via the external device interface 130 is another value, the processor may determine the type of the wire charging device to the external device interface 130 as a USB storage device or a USB charger.

If the wire connection device is determined to be a wire charging device at block 303, the electronic device may convert power supplied from the charging device into the charging voltage and charging current for charging the battery (e.g., battery 220) using a first charging circuit (e.g. first charging circuit 200) or a second charging circuit (e.g., second charging circuit 210) at block 305.

If the first charging circuit and the second charging circuit are different types of charging circuits, the electronic device may select one of the first and second charging circuits based on the type and/or charge capacity of the wire charging device and charge the battery using the selected charging circuit. Operations for selecting a charging circuit and charging a battery based on the type and/or charge capacity of a wire charging device will be described below with reference to FIG. 4.

At block 307, the electronic device may determine whether charging using the wire charging device has ended. For example, the electronic device can determine that charging using the wire charging device has ended when the wire charging device is separated from the electronic device. The process may return to block 305 to keep supplying charge power from the wire connection device to the battery if the charging using the wire charging device has not ended, but may end if charging using the wire charging device has ended.

If at block 303 it is determined that the wire connection device is not the charging device, at block 309 the electronic device may determine whether to enter the USB OTG mode. For example, if a storage device is connected to the electronic device through a USB connection, the electronic device may display a message inquiring whether to enter the USB OTG mode and receive an input from a user in response to the message. The electronic device may also automatically enter the USB OTG mode when an external device which supports the USB OTG mode is connected. If determination is made not to enter the USB OTG mode, the electronic device may terminate the process.

If determination is made at block 309 to enter the USB OTG mode, the electronic device may apply power to the wire connection device by using, for example, the first charging circuit, at block 311. For example, the electronic device may apply power charged in the battery, through the first charging circuit, to an external device that is connected to the electronic device using a wired connection for the operation of the external device. At block 313, the electronic device may examine whether the USB OTG mode has ended. For example, the electronic device may determine whether the USB OTG mode has ended when the wire connection device is separated from the electronic device or when the user requests termination of the USB OTG function.

At block 315, the electronic device may examine whether a wireless charge event is detected. For example, the electronic device may detect the generation of the wireless charge event when a wireless charge function is selected by the user or when power supplied by a wireless charging device is detected. The charging unit 120 of the electronic device may detect the generation of the wireless charge event when induced current inputted from the wireless charging device via an external device interface 130 is detected. If the wireless charge event has not been generated, the process may be repeated from block 301.

If the wireless charge event is generated, at block 317, the electronic device may convert wirelessly-charged power into charging voltage and charging current for charging the battery, using the second charging circuit. At this time, the electronic device can apply the power charged in the battery to the wire connection device using the first charging circuit, and at the same time charge the battery using the wireless charging voltage received through the second charging circuit. At block 319, the electronic device may determine whether the wireless charging has end. For example, the electronic device may determine that the wireless charging has ended when voltage is no longer detected from the wireless charging device, or when termination of the wireless charging function is requested by a user. If at block 319 determination is made that the wireless charging has not ended, the process may repeat from block 301. If at block 319 determination is made that the wireless charging has ended, the process may end.

Figure 4:
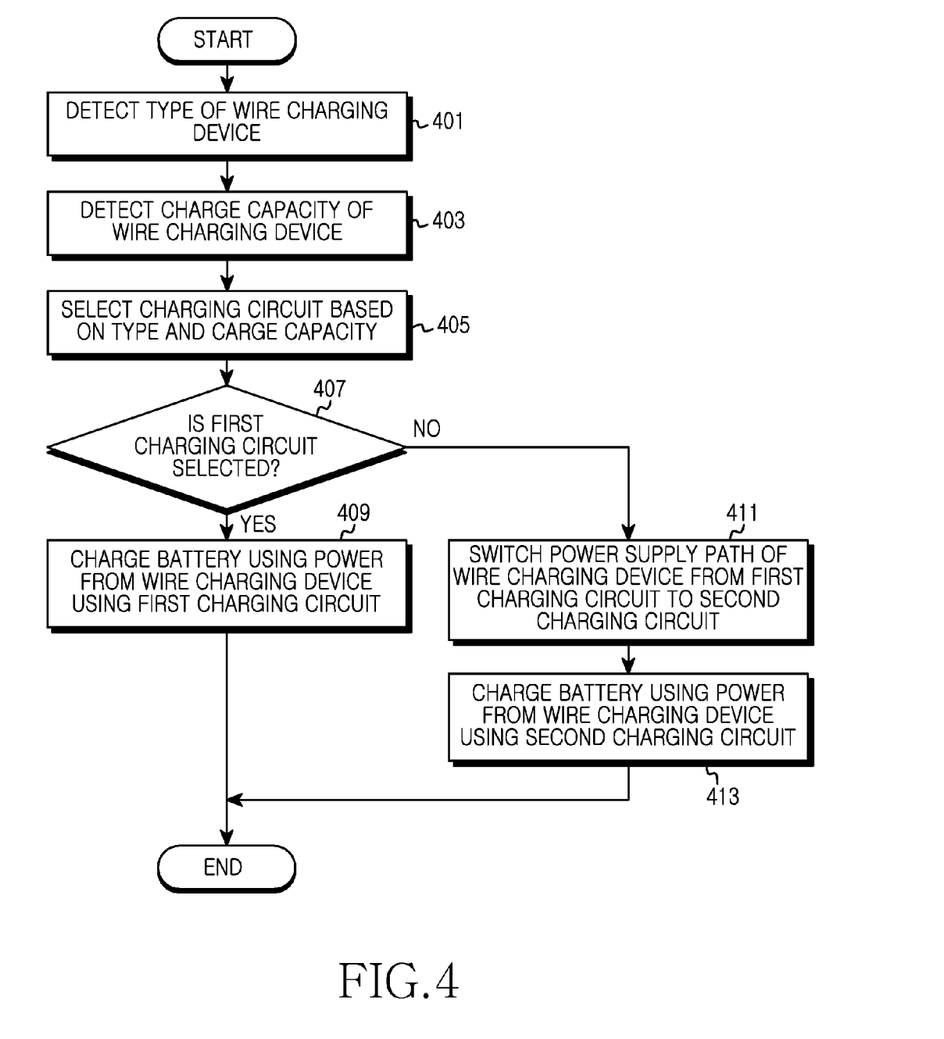
FIG. 4 is a diagram illustrating a procedure of performing a wire charging according to an embodiment of the present disclosure.

FIG. 4 is a diagram illustrating an example process of performing wire charging according to the present disclosure. The operations of the process may be performed, for example, by the electronic device. Descriptions with respect to FIG. 4 will be made assuming that a first charging circuit and a second charging included in the electronic device are different types of charging circuits. For example, the first charging circuit may be a switching charging circuit, and the second charging circuit may be a linear charging circuit. For illustration purposes, the following description is given under assumption that a wireless charging device is not connected to the electronic device.

Referring to FIG. 4, at block 401 the electronic device may detect a type of the wire charging device connected to the electronic device. At block 403, the electronic device may detect the charge capacity of the wire charging device detected at block 401 (e.g., amount of the charging current). In detecting the type of the wire charging device, for example, the electronic device may receive an ID from the connected wire charging device and determine the type of the wire charging device.

At block 405, the electronic device may select one of the first charging circuit and the second charging circuit included in the electronic device based on the determined type and charging capacity of the wire charging device. The selection may be achieved using a look up table stored in a memory where various ranges of charging capacity for different type of wire charging devices are pre-stored. For example, the electronic device may select the switching charging circuit when the amount of voltage (or current) from the wire charging device received or detected thereon is greater than a threshold value, or if a detected charging capacity is equal to or greater than the threshold value. For example, the electronic device may select the switching charging circuit if the detected charging capacity is equal to or higher than a 1 A. The electronic device may select the linear charging circuit if the amount of voltage (or current) from the wire charging device is lower than a threshold value, or if a detected charging capacity is lower than or equal to the threshold value. For example, the electronic device may select the linear charging circuit if a detected charging capacity is equal to or lower than a 500 mA.

At block 407, the electronic device may determine whether the first charging circuit connected to the wire connection device is selected. If determination is made at block 407 that the first charging circuit is selected, block 409 may be performed and the electronic device may convert power from the wire charging device into the charging voltage and charging current of the electrode device via the first charging circuit, for charging the battery of the electronic device. After performing block 409, the process may end.

If at block 407 determination is made that the first charging circuit is not selected (e.g., the second charging circuit connected to the wireless connected device is selected), block 411 may be performed and the electronic device may perform a switching operation to switch the power supply path of the wire charging device from first charging circuit to the second charging circuit. For example, the electronic device may include a switch (e.g., switch 202) for switching the power supply path of the wire charging device from first charging circuit to the second charging circuit to apply power of the wire charging device to the second charging circuit. At block 413, the electronic device may convert the power from the wire charging device into the charging voltage and charging current of the electronic device via the second charging circuit, for charging the battery of the electronic device. After performing block 413, the process may end.

Figure 5A:
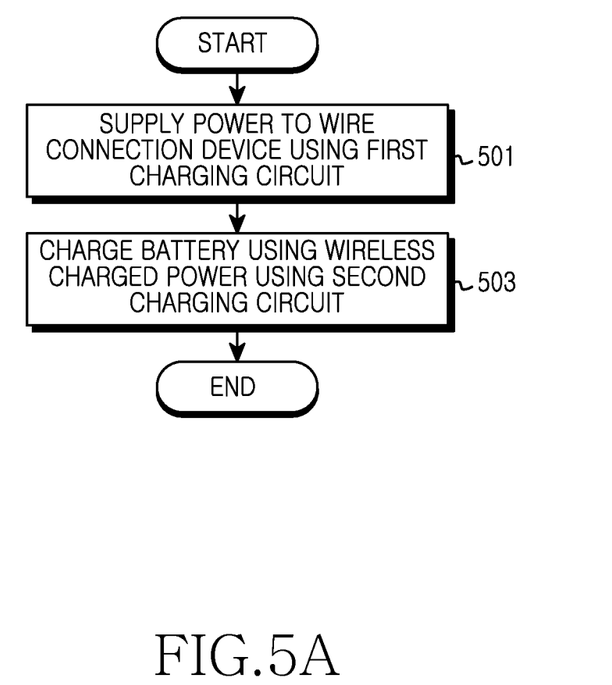
FIG. 5A is a diagram illustrating a procedure of performing an OTG operation according to an embodiment of the present disclosure.

FIG. 5A is a diagram illustrating an example process for performing an USB OTG operation in an electronic device.

Figure 5B:
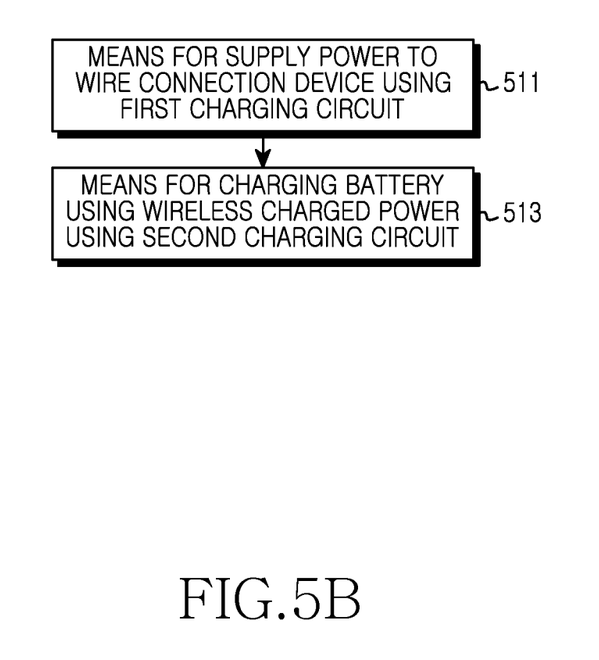
FIG. 5B is a diagram means for a procedure of performing a wireless charging while performing an OTG operation according to the present disclosure.

Referring to FIG. 5A, the electronic device may apply power to the wire connection device via the first charging circuit at block 501, and receive power from the wireless charging device at block 503 for charging the battery using the second charging circuit. The electronic device may perform the operation of block 503 while performing the operation of block 501. FIG. 5B illustrates hardware means for performing wireless charging while performing an OTG operation in the electronic device according to the present invention.

Referring to FIG. 5B, the electronic device includes means 511 for supplying power to the wire connection device via the first charging circuit and means 513 for charging its battery using power supplied from the wireless charging device via the second charging circuit.

Figure 6A:
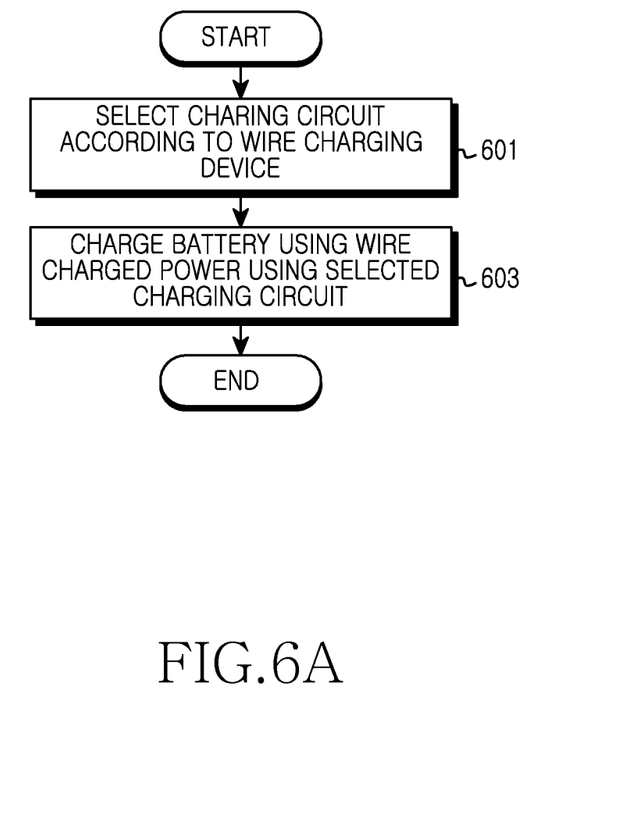
FIG. 6A is a diagram illustrating a procedure of performing s wire charging according to an embodiment of the present disclosure.

FIG. 6A is a diagram illustrating an example process for performing wire charging in an electronic device.

Referring to FIG. 6A, at block 601 the electronic device may select one charging circuit among a plurality of charging circuits according to a wire charging device connected to the electronic device as discussed above. For example, the electronic device may select a charging circuit according to the ID, type and/or charging current of the wire charging device. At block 603, the electronic device may receive power from the wire charging device via the selected charging circuit for charging the battery of the electronic device.

Figure 6B:
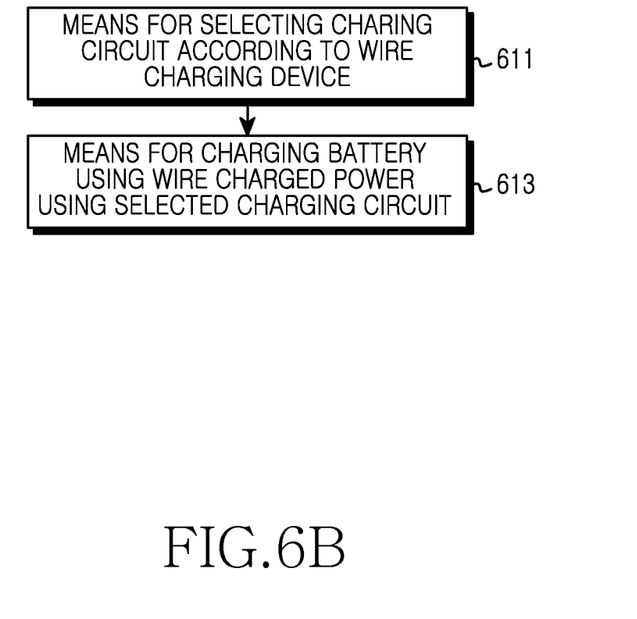
FIG. 6B is a diagram illustrating means for performing a wire charging procedure according to the present disclosure.

FIG. 6B illustrates hardware means for performing a wire charging procedure in the electronic device according to the present invention. Referring to FIG. 6B, the electronic device includes means 611 for selecting a specific charging circuit among a plurality of charging circuits according to a wire charging device connected to the electronic device and means 613 for charging the battery using power supplied from the wire charging device via the selected charging circuit. In this case, the means for selecting the charging circuit of the electronic device selects a charging circuit corresponding to the ID, type and/or capacity of a charging current of the wire charging device.

The above-described methods, processes and/or operations according to the present disclosure can be implemented in hardware, firmware or as software or computer code that can be stored in a recording medium such as a CD-ROM, RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, the microprocessor controller or the programmable hardware may include memory components, e.g., RAM, ROM, Flash, etc. that may store or receive software or computer code that when accessed and executed by the computer, processor or hardware implement the methods, processes and/or operations described herein. In addition, it would be recognized that when a general purpose computer accesses code for implementing the methods, processes and/or operations shown herein, the execution of the code transforms the general purpose computer into a special purpose computer for executing the methods, processes and/or operations shown herein.

While the present disclosure has been shown and described with reference to certain example embodiments, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope of the claims will be construed as being included in the present disclosure.

What is claimed is:

1. An operating method of an electronic device, the operating method comprising:
    providing power from a battery to an external device using a first circuit based on determining that the external device is connected to the electronic device through an USB connection;
    receiving power from a first power source wirelessly connected to the electronic device;
    providing the received power to the battery using a second circuit,
    determining whether a second power source is connected to the electronic device based upon determining that the external device is disconnected from the electronic device; and
    providing power to the battery using the power supplied from the second power source using the first circuit based upon determining that the second power source is connected to the electronic device,
    wherein providing power to the battery using the first circuit and providing power to the battery using the second circuit are performed simultaneously,
    wherein providing power to the external device using the first circuit and providing received power to the battery using the second circuit are performed simultaneously.

2. The method of claim 1, wherein providing the power from the battery comprises:
    providing the power from the battery to the external device through a path comprising a reverse path of a path through which the electronic device is configured to receive power from the second power source.

3. The method of claim 2, wherein the first power source and the second power source each comprises one of a wireless charging device or a wire charging device.

4. The method of claim 1, wherein at least one of the first circuit and the second circuit comprises at least one of a switching charging circuit and a linear charging circuit.

5. The method of claim 1, further comprising:
    detecting the external device connected to the electronic device;
    determining whether the detected external device is the second power source;
    wherein the electronic device provides power from the battery to the external device using the first circuit if the detected external device is not the second power source.

6. An electronic device comprising:
    a battery;
    a first circuit configured to provide power from the battery to an external device based on a determination that the external device is connected to the electronic device through an USB connection; and
    a second circuit configured to receive power from a first power source wirelessly connected to the electronic device, and provide the received power to the battery,
    wherein power being provided to the external device using the first circuit and received power being provided to the battery using the second circuit are performed simultaneously,
    wherein, based on a determination that the external device is disconnected from the electronic device and a second power source is connected to the electronic device, power is provided to the battery using power supplied from the second power source using the first circuit,
    wherein power being provided to the battery using the first circuit and power being provided to the battery using the second circuit are performed simultaneously.

7. The electronic device of claim 6, wherein the first circuit is configured to supply power to the external device using a reverse path of a path through which the electronic device receives power from the second power source.

8. The electronic device of claim 7, wherein the first power source and the second power source each comprises one of a wireless charging device or a wire charging device.

9. The electronic device of claim 6, wherein the first circuit and the second circuit include at least one of a switching charging circuit and a linear charging circuit.

10. The electronic device of claim 6, wherein the electronic device is configured to detect the external device connected to the electronic device, and to determine whether the detected external device is the second power source,
    wherein the electronic device provides power from the battery to the external device using the first circuit if the detected external device is not the second power source.

* * * * *